(12) United States Patent
Uenoyama et al.

(10) Patent No.: US 6,324,626 B1
(45) Date of Patent: Nov. 27, 2001

(54) SEMICONDUCTOR MEMORY

(75) Inventors: Hiromi Uenoyama; Hiroki Takagi, both of Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 09/108,230

(22) Filed: Jul. 1, 1998

(30) Foreign Application Priority Data

Jul. 1, 1997 (JP) .................................................... 9-175647

(51) Int. Cl.[7] ...................................................... G06F 12/00
(52) U.S. Cl. ............................... 711/163; 711/156; 463/29
(58) Field of Search .................................... 711/124, 146, 711/163, 156; 235/380; 713/168; 342/51; 463/29; 705/410; 365/185.04

(56) References Cited

U.S. PATENT DOCUMENTS

| | | | |
|---|---|---|---|
| 4,614,861 | * 9/1986 | Pavlov et al. ......................... 235/380 |
| 4,897,875 | * 1/1990 | Pollard et al. ......................... 713/168 |
| 5,502,445 | * 3/1996 | Dingwall et al. ......................... 342/51 |
| 5,599,231 | * 2/1997 | Hibino et al. ........................... 463/29 |
| 5,671,146 | * 9/1997 | Windel et al. ......................... 705/410 |
| 5,991,194 | * 11/1999 | Jigour et al. ..................... 365/185.04 |

* cited by examiner

Primary Examiner—Matthew Kim
Assistant Examiner—Fred F. Tzeng
(74) Attorney, Agent, or Firm—Arent Fox Kintner Plotkin & Kahn PLLC (57) ABSTRACT

A semiconductor memory has a main memory and an ID memory, of which both store data in a nonvolatile memory. The data stored in the ID memory is compared with data entered from outside by a verifying circuit. Whether access to the main memory is permitted or not depends on the result of the verification by the verifying circuit. The operation code for accessing the ID memory is different from the operation code for accessing the main memory. The operation code for the ID memory is changed in accordance with the data stored in the ID memory.

22 Claims, 5 Drawing Sheets

SEMICONDUCTOR MEMORY

BACKGROUND OF THE INVENTION

1. Field of the Invention

The present invention relates to a semiconductor memory, and particularly to a semiconductor memory that can effectively be used as a backup memory for storing data that is processed with the progress of a program being executed.

2. Description of the Prior Art

In general, it is possible to read data stored in a semiconductor memory simply by feeding it with an address signal and a read signal. In addition, most semiconductor memories are designed to be compatible between different manufacturers, that is, they are "standardized". Unfortunately, this has been prompting illegal duplication of programs stored in semiconductor memories and thus unauthorized use of the functions such programs offer.

SUMMARY OF THE INVENTION

An object of the present invention is to provide a semiconductor memory with which it is difficult to illegally duplicate the program stored therein, and to provide a game cassette employing such a semiconductor memory.

Another object of the present invention is to provide a semiconductor memory that, when employed as a backup memory for storing data that is processed with the progress of a program being executed, makes it substantially impossible to execute an illegally duplicated program, and to provide a game cassette employing such a semiconductor memory.

To achieve the above objects, according to one aspect of the present invention, in a semiconductor memory that has, as part of its data storage means, an ID memory for storing data in a nonvolatile manner and has a comparing means for comparing the data stored in the ID memory with data entered from outside, and in which access to the portions of the data storage means other than the ID memory is permitted in accordance with the result of the comparison performed by the comparing means, the operation code for accessing the ID memory is different from the operation code for accessing the portions of the data storage means other than the ID memory, and the operation code for the ID memory is changed in accordance with the data stored in the ID memory.

This design, by demanding entry of the data stored in the ID memory, provides a protection against unauthorized access to the portions of the data storage means other than the ID memory, and in addition, by using different operation codes for the access to the ID memory and to the portions of the data storage means other than the ID memory, and by changing the operation code for the ID memory in accordance with the data stored in the ID memory, provides a protection against unauthorized access to the ID memory as well.

Moreover, according to another aspect of the present invention, a command decoder for decoding operation codes is composed of PLAs (programmable logic arrays) in such a way that the output corresponding to a specific operation code is changed in accordance with the data stored in the ID memory, and this specific operation code is allotted to the operation code for the ID memory.

This design makes it possible to change the operation code for the ID memory in accordance with the data stored in the ID memory without unduly increasing the complexity and scale of the circuit.

Moreover, according to another aspect of the present invention, a latching means for holding the data is provided so that, a predetermined time after the start of the supply of power, the data stored in the ID memory is read out so as to be held in the latch means, and that the output of the command decoder in response to the above-mentioned specific operation code is made to change in accordance with the data held in the latching means.

For example, a semiconductor memory such as an EEPROM is provided with a circuit for generating the high voltage required in writing and reading data to and from a memory array. This circuit is provided with a program timer for controlling the duration for which the generated high voltage is applied. Accordingly, this program timer can be used to control the timing with which the data stored in the ID memory is read out so as to be held in the latch means.

Moreover, according to another aspect of the present invention, when the data stored in the ID memory is outputted, the data is changed in accordance with itself.

This design provides a securer protection against unauthorized reading of data from the ID memory.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Figure 1:
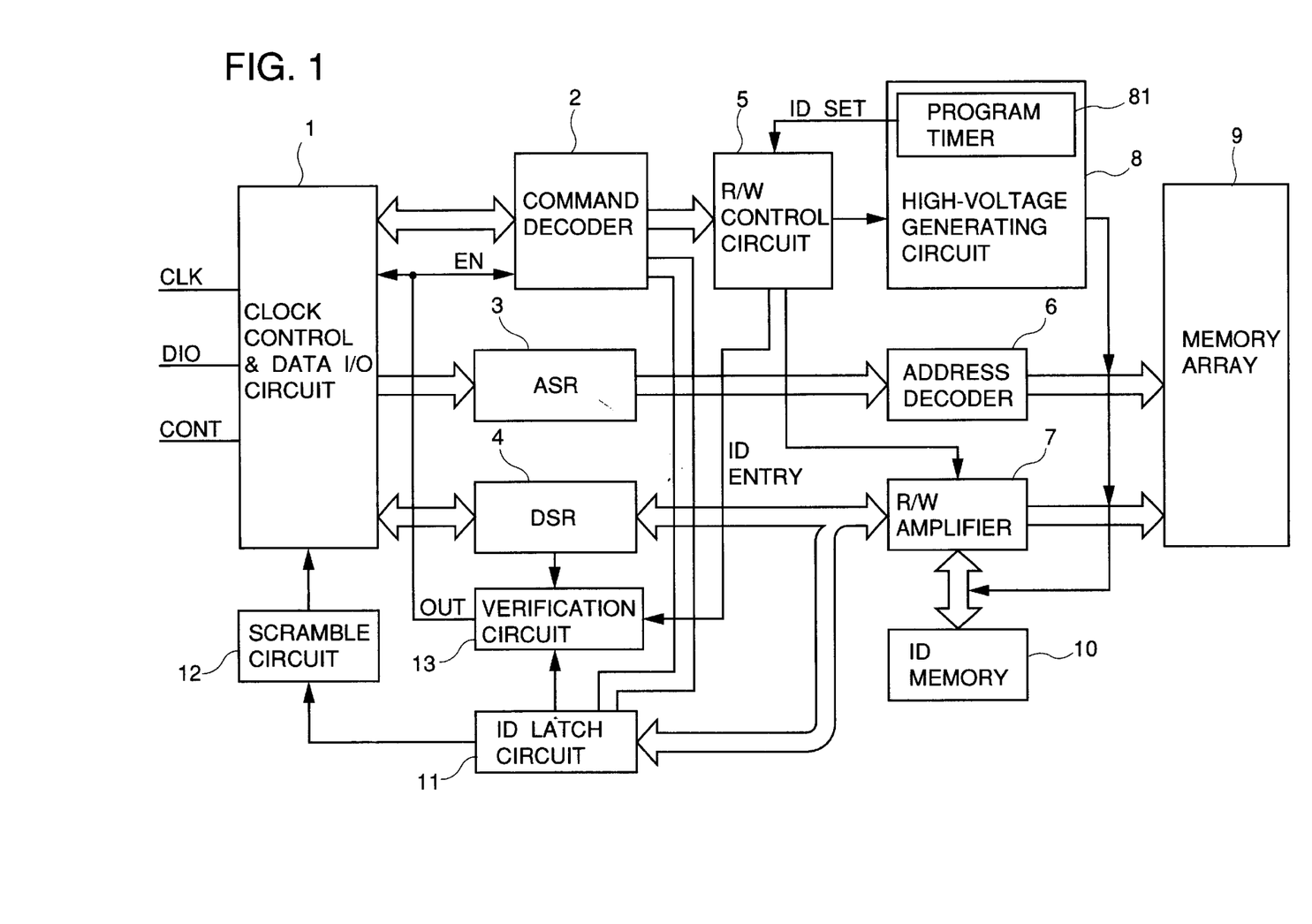
FIG. 1 is a block diagram of an example of the semiconductor memory according to the present invention.
Figure 6:
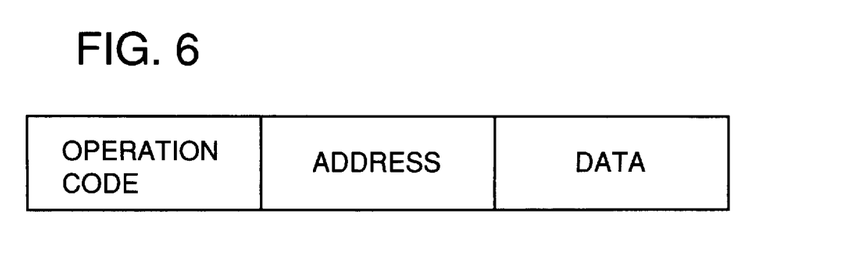
FIG. 6 is a diagram illustrating an example of the structure of a command that is fed in and out as serial data via the data input/output terminal DIO.

Hereinafter, an embodiment of the present invention will be described with reference to the drawings. FIG. 1 is a block diagram of a semiconductor memory embodying the present invention. A clock control & data I/O (input/output) circuit 1, in synchronism with a clock it receives at its clock terminal CLK, regulates the timing with which the various parts of the semiconductor memory operate. During the writing of data, the clock control & data I/O circuit 1 divides the serial data it receives at its data I/O terminal DIO into three classes of codes, i.e. a command code, an address code, and a data code, and outputs the command code to a command decoder 2, the address code to an ASR (address shift register) 3, and the data code to a DSR (data shift register) 4. Moreover, during the reading of data (excluding the data stored in an ID memory 10), this circuit 1 outputs the data held in the DSR 4 via the data I/O terminal DIO in serial format. FIG. 6 shows an example of the structure of a command that is fed in and out as serial data via the data I/O terminal DIO. Furthermore, this circuit 1, in accordance with the signal it receives at its control terminal CONT, performs command changes and chip selection to bring the semiconductor memory into various states.

The command decoder 2 decodes the command code fed from the data I/O circuit 1 and feeds the result to a R/W (read/write) control circuit 5. The ASR 3 holds the address code fed from the data I/O circuit 1. The DSR 4, during the writing of data, holds the data fed form the data I/O circuit 1, and, during the reading of data, holds the data that a R/W amplifier 7 has read out from a memory array 9. Thus, there is no occasion for DSR 4 to hold the data read out from the ID memory 10.

The R/W control circuit 5, in accordance with the command decoded by the command decoder 2, performs the reading and writing of data on the memory array 9; it controls the reading and writing of data on the ID memory 10 as well.

The address decoder 6 decodes the address code held in the ASR 3 and thereby selects the address (of a memory cell) of the memory array 9 to be accessed. The R/W amplifier 7, in response to the control signal fed from the R/W control circuit 5, reads out data from the memory array or from the ID memory 10, or writes the data held in the DSR 4 to the memory array 9 or to the ID memory 10.

A high-voltage generating circuit 8, in response to the control signal fed from the R/W control circuit 5, steps up the voltages of the signals fed from the address decoder 6 and the R/W amplifier 7 to the memory array 9 and the ID memory 10 to make them sufficiently high to achieve the writing of data to the memory array 9 and the ID memory 10.

The memory array 9 and the ID memory 10 store data. The memory array 9 and the ID memory 10 are both composed of memory cells of the EEPROM (electrically erasable programmable read-only memory) type so that they keep data even while they are not receiving electric power; that is, both store data in a nonvolatile manner. Note that the ID memory 10 may be included in the memory array 9 in terms of its physical wiring.

When the data stored in the ID memory 10 (hereafter referred to as the "ID data") is read out, an ID latch circuit 11 holds the thus read ID data. A scramble circuit 12 outputs the data stored in the ID latch circuit 11 after modifying the data in accordance with the data itself, i.e. after "scrambling" it. The data outputted from the scramble circuit 12 is fed out via the data I/O terminal DIO of the clock control & data I/O circuit 1 when the ID data is read out.

Under the control of the R/W control circuit 5, a verifying circuit 13 compares the data held in the DSR 4 with the data held in the ID latch circuit 11 to check whether they agree. The result of the verification is fed to the enable terminal EN of the command decoder 2 and to the clock control & data I/O circuit 1. After the entry of data to be compared with the ID data (hereafter the data fed in through external circuits for comparison with the ID data is referred to as the "entered ID data"), if the verification circuit 13 outputs a high level, the clock control & data I/O circuit 1 outputs a protection canceling signal via its data I/O terminal DIO. The verifying circuit 13 outputs a high level only when the ID data and the entered ID data agree.

Figure 2:
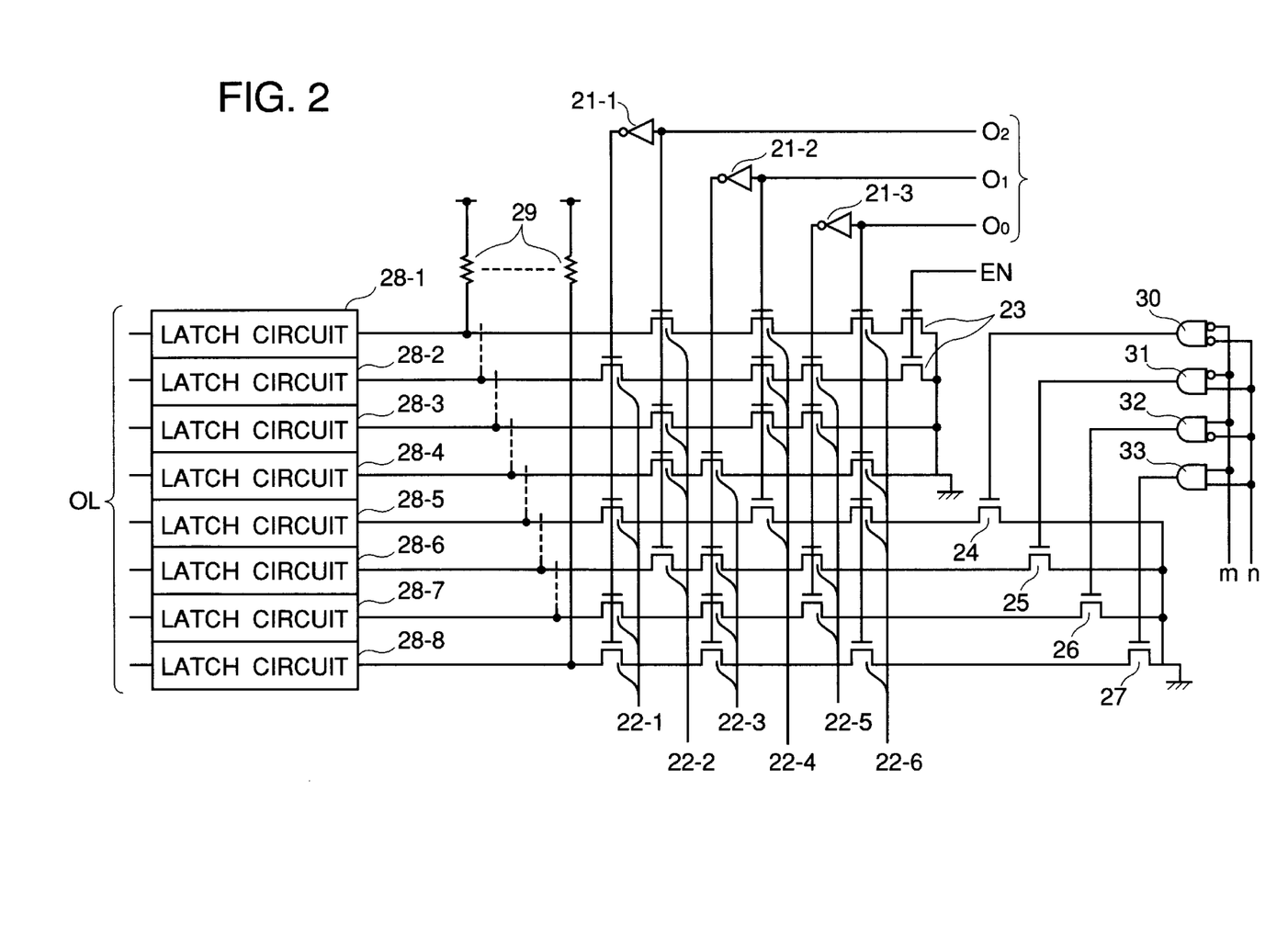
FIG. 2 is a diagram illustrating an example of the structure of the command decoder (composed of PLAs)

As shown in FIG. 2, the command decoder 2 is composed of PLAs (programmable logic arrays). Here, it is assumed that an operation code consists of three bits. In FIG. 2, $O_2$, $O_1$, and $O_0$ represent input terminals for individually receiving the three bits of the operation code. The command decoder 2 receives data (operation codes) from the clock control & data I/O circuit 1 shown in FIG. 1. EN represents an enable terminal; numerals 21-1, 21-2, and 21-3 represent inverters; numerals 22-1, 22-2, . . . ,22-6, 23, 24, 25, 26, and 27 represent n-channel MOS-type FETs (hereinafter simply referred to as "nMOS transistors"; numerals 281, 28-2, . . . , 28-8 represent latch circuits; numeral 29 represents resistors; numerals 30, 31, 32, and 33 represent AND circuits.

The input terminals $O_2$, $O_1$ and $O_0$ are connected to the input terminals of the inverters 21-1, 21-2, and 21-3, respectively. The gates of the nMOS transistors 22-1, 22-3, and 22-5 are connected to the output terminals of the inverters 21-1, 21-2, and 21-3, respectively. The gates of the nMOS transistors 22-2, 22-4, and 22-6 are connected to the input terminals $O_2$, $O_1$, and $O_0$, respectively. The gate of the nMOS transistor 23 is connected to the enable terminal EN.

The gates of the nMOS transistors 24, 25, 26, and 27 are connected to the output terminals of the AND circuits 30, 31, 32, and 33, respectively. The AND circuit 30 receives the mth and nth bits, after inversion, of the data held in the ID latch circuit 11. The AND circuit 31 receives the mth bit, after inversion, and the nth bit, as it is, of the same data. The AND circuit 32 receives the mth bit, as it is, and the nth bit, after inversion, of the same data. The AND circuit 33 receives the mth and nth bits, as they are, of the same data.

The input terminals of the latch circuits 28-1, 28-2, . . . , 28-8 are, on the one hand, connected to a high-level point through the respective resistors 29; they are, on the other hand, connected to a low-level (ground-level) point, each through the drain-source channels of a different combination of three of the nMOS transistors 22-1, 22-2, . . . , 22-6, and in addition, for the latch circuits 28-1 and 28-2, through the drain-source channels of the nMOS transistor 23 and, for the latch circuits 28-5, 28-6, 28-7, and 28-8, through the drain-source channels of the nMOS transistors 24, 25, 26, and 27, respectively. The outputs from the latch circuits 2 8-1, 28-2, . . . , 28-8 are used as the output of the command decoder 2.

Having the structure as described above, the command decoder 2 operates in the following manner. When the command decoder 2 is receiving no input of a three-bit operation code, it keeps all of its eight-bit output lines OL at a high level. When the command decoder 2 receives a three-bit operation code, it drops one of its eight-bit output lines to a low level in accordance with the received operation code. For example, when the operation code is (010) (i.e. when the input terminals $O_2$, $O_1$, and $O_0$ are at the levels representing 0, 1, and 0, respectively), only the output line of the latch circuit 28-2 is dropped to a low level; when the operation code is (100) (i.e. when the input terminals $O_2$, $O_1$, and $O_0$ are at the levels representing 1, 0, and 0, respectively), only the output line of the latch circuit 28-6 is dropped to a low level. Note that the outputs of the latch circuits 28-1 and 28-2 never drop to a low level unless a high level is fed to the enable terminal EN. Note also that, depending on the data held in the latch circuit 11, the outputs of the latch circuits 28-5, 28-6, 28-7, and 28-8 are not permitted to drop to a low level even when an operation code that so demands is received.

The output of the command decoder 2 is fed to the R/W control circuit 5, which then operates to control the various parts of the semiconductor memory in the following manner. When the received operation code is (111), causing only the output line of the latch circuit 28-1 to drop to a low level, data is read out from the memory array 9. When the received operation code is (010), causing only the output line of the latch circuit 28-2 to drop to a low level, data is written in to the memory array 9. When the received operation code is (110), causing only the output line of the latch circuit 28-3 to drop to a low level, the data entered together with the operation code and held in the DSR 4 is compared with the data held in the ID latch circuit 11. When the received operation code is (101), causing only the output line of the latch circuit 28-4 to drop to a low level, data is written in to the ID memory 10. When the received operation code is (011), (100), (000), Or (001), causing only the output line of the latch circuit 28-5, 28-6, 28-7, or 28-8 to drop to a low level, the data held in the ID latch circuit 11 is fed out through the scramble circuit 12 via the data I/O terminal DIO of the clock control & data I/O circuit 1.

In the structure described above, when the operation code (110), which signifies the entry of ID data, is received, the data entered together with the operation code is, through the clock control & data I/O circuit 1, fed to the DSR 4 to be held therein. The output of the command decoder 2 (in which only the output line of the latch circuit 28-3 is at a low level) causes the R/W control circuit 5 to feed an ID entry signal to the verifying circuit 13. This leads the verifying circuit 13 to compare the data entered together with the ID entry operation code (110) and stored in the DSR 4 with the data held in the ID latch circuit 11 and, when these two sets of data agree, output a high level. The output of the verifying circuit 13 is fed to the enable terminal EN of the command decoder 2.

When the semiconductor memory starts receiving electric power, the output of the verifying circuit 13 is at a low level. After this output has risen to a high level in a situation as described above, it may be kept invariable until the ID entry signal is fed from the R/W control circuit 5 next time, or may be dropped to a low level when access to the memory array 9 is complete. This latter method demands entry of the ID data every time the memory array 9 is accessed, and thus helps fortify the protection against unauthorized access to the memory array 9.

The high-voltage generating circuit 8 has a program timer 81, which controls; the timing with which the high-voltage obtained by the stepping-up action of the high-voltage generating circuit 8 is applied to the memory array 9 and the ID) memory. In addition, the program timer 81 starts counting time as soon as the semiconductor memory starts receiving electric power, and, when its count reaches a predetermined length of time, outputs an ID set signal to the R/W control circuit 5. In response, the R/W control circuit 5 controls the various parts of the semiconductor memory so that the ID data is read out and stored in the ID latch circuit 11.

In this way, a predetermined time after the semiconductor memory starts receiving the supply of electric power, when the supplied voltage is supposed to have risen to a sufficiently high level to perform the reading of data without failure, the ID data is automatically read out and held in the ID latch circuit 11. Using the program timer incorporated in the high-voltage generating circuit in this way eliminates the need to provide an extra timer separately, and thus helps minimize the increase in the number of components and in the circuit area.

As described above, only when the ID data agrees with the data entered together with the ID entry code (110), the enable terminal EN of the command decoder 2 rises to a high level. This validates the read code (111), which requests the reading of data from the memory array 9, and the write code (010), which requests the writing of data to the memory array 9, and thereby permits access to the memory array 9.

On the other hand, the reading of the ID data is not allowed unless the operation code (011), (100), (000), or (001) is entered when the mth and nth bits of the data held in the ID latch circuit 11, i.e. of the ID data, are (00), (01), (10), or (11), respectively. In other words, the ID read code, which is an operation code that requests the reading of -data from the ID memory 10, changes in accordance with the data stored in the ID memory 10.

This changing of the ID read code in accordance with the ID data is achieved by composing the command decoder 2 of PLAs. This helps minimize the increase in the complexity and scale of the circuit.

Moreover, even when the ID read code corresponding to the ID data is entered, the data held in the ID latch circuit 11 is scrambled by the scramble circuit 12 before being fed out. That is, the ID data is never outputted intact.

In short, in the semiconductor memory of the embodiment under discussion, a protection against unauthorized access to the memory array 9 is provided by demanding entry of the ID data, and in addition a protection against unauthorized access to the ID memory 10 is provided by using different operation codes for access to the ID memory 10 and to the memory array 9, by changing the ID read code in accordance with the ID data, and by outputting the ID data after scrambling it by the scramble circuit 12. That is, a one-fold protection is provided against illegal writing to the ID memory 10, and a three-fold protection is provided against illegal reading from the ID memory 10.

Figure 3:
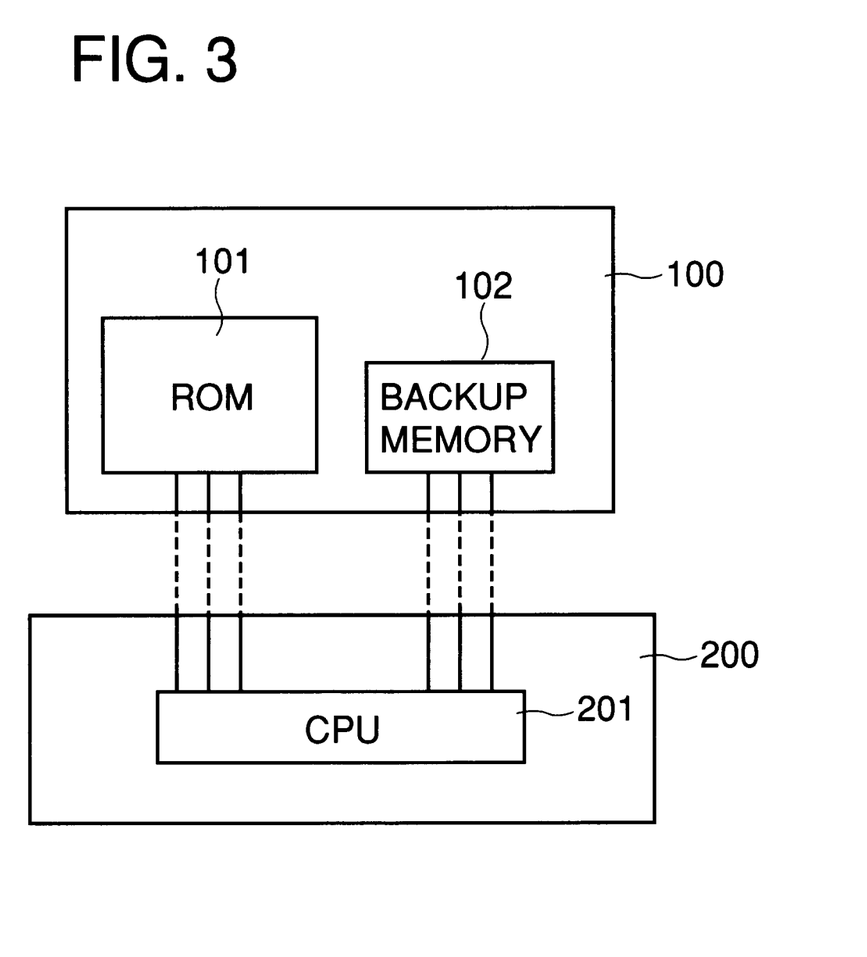
FIG. 3 is a diagram schematically illustrating a game cassette that employs the semiconductor memory of the invention as a backup memory and a game machine to which the game cassette is loaded.

The semiconductor memory described above can effectively be used as a so-called backup memory, i.e. a memory used to store data that is processed with the progress of a program being executed. For example, as shown in FIG. 3, a game cassette 100 that is loaded into a game machine when in use includes a ROM 101 for storing a predetermined program and a backup memory 102. When the semiconductor memory described above is used as this backup memory 102, it serves in the following manner.

For each program (i.e. for each game title), the programmer defines the data to be stored in the ID memory 10 within the backup memory 102. Then, the data is stored in the ID memory 10, and the program is configured in such a way that the writing or reading of data to and from the backup memory 102 is possible only when predetermined data is entered to the backup memory 102 and, in response, the backup memory 102 outputs a predetermined signal (protection canceling signal). On the other hand, since it is unnecessary to allow the player of the game to write or read data to and from the ID memory 10 (this needs to be done only by the programmer simply to store the defined data in the ID memory 10 and to check whether the defined data is stored in the ID memory 10), the program stored in the ROM 101 is so configured as to include neither the ID read code nor the ID write code (the operation code that requests the writing of data to the ID memory 10).

Figure 4:
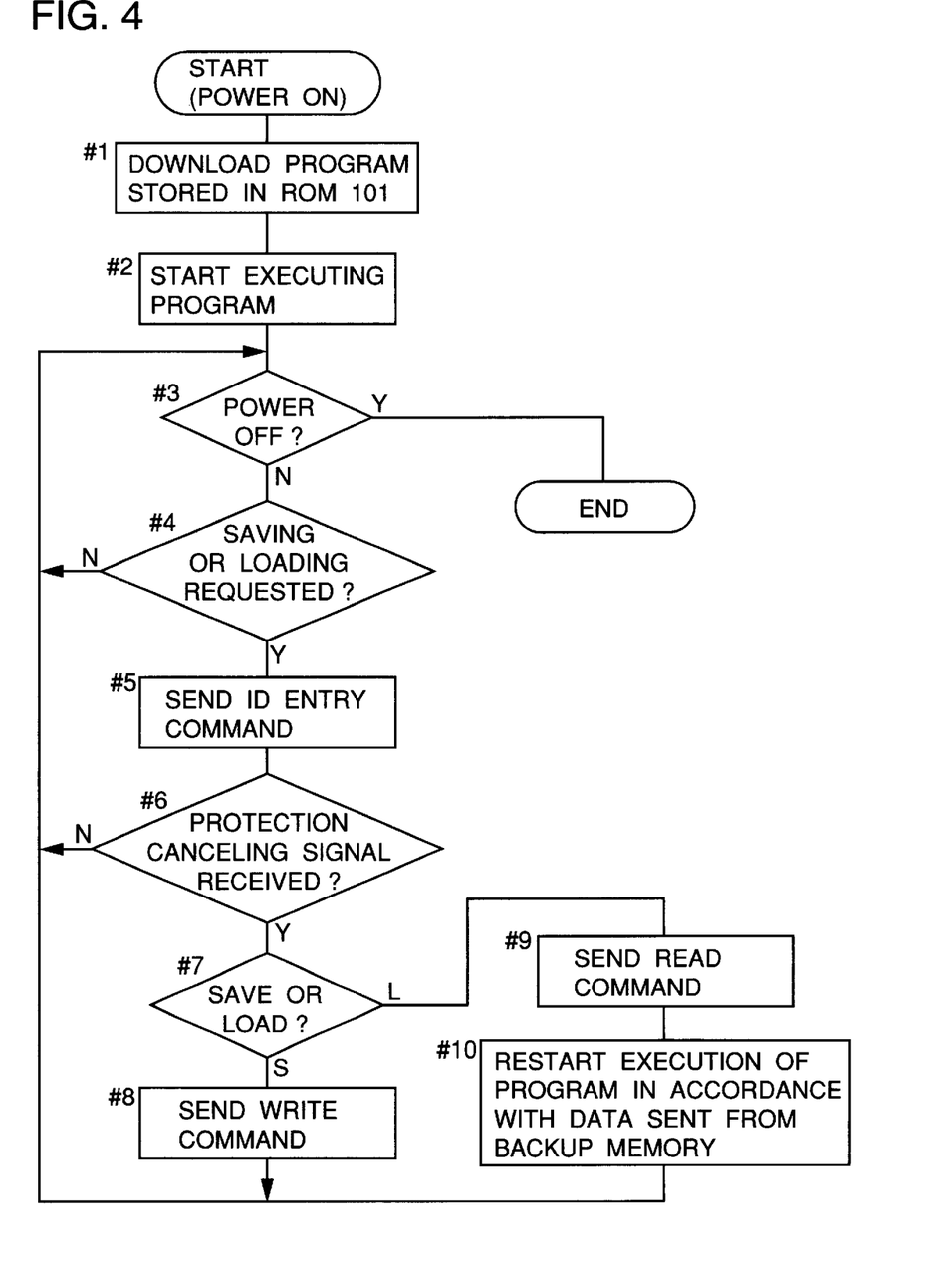
FIG. 4 is a flow chart illustrating the operation, based on the program stored in the ROM 101, of the CPU 201 provided within the game machine.

A game cassette designed and produced in this way is loaded into the game machine 200 to run a game. The flow chart shown in FIG. 4 illustrates the sequence of operations performed by the CPU 201 of the game machine 200 in, accordance with the program stored in the ROM 101 inside the game cassette 100 when a game is played. When the game cassette 100 is loaded into the game machine 200, the ROM 101 and the backup memory 102 provided inside the game cassette 100 are connected to the CPU 201 provided in the game machine 200. When, in this state, a predetermined operation (normally the turning-on of the power) is performed on the game machine, the CPU 201 starts downloading the program stored in the ROM 101 (step #1).

When the downloading is complete, the CPU 201 starts executing the program (#2). Thereafter, until the power is turned off (#3), the CPU 201, at any time when the game player requests the saving or loading of data through a predetermined operation (Y of #4), transmits to the backup memory 102 an ID entry command that consists of an ID entry code (in the above-described embodiment, (110)) and the data defined within the program (#5). In response, the backup memory 102 compares the transmitted data and the ID data (the data held in the ID latch circuit 11). If the two sets of data agree, the backup memory 102 permits access to the memory array 9 (i.e. cancels the protection against access to the memory array 9), and simultaneously transmits a protection canceling signal to the CPU 201.

When, in response to the entry of ID data (i.e. in response to the ID entry command transmitted in #5), the protection canceling signal is transmitted from the backup memory 102 (Y of #6), the CPU 201, if it is instructed to save data (S of #7), transmits to the backup memory 102 a write command consisting of a write code (in the above-described embodiment, (010)), an address code, and the data, that is needed to restart the program (e.g. the data related to the address and state at and in which the program is suspended) (#8). In response, the backup memory 102 stores the data transmitted to the address within the memory array 9 as; specified by the address code.

On the other hand, if it is instructed to load data (L of #7), the CPU 201 transmits to the backup memory 102 a read command consisting of a read code (in the above-described embodiment, (111)) and an address code (#9). In response, the backup memory 102 reads out the data at the address within the memory array 9 as specified by the address code, and transmits it to the CUP 201. In accordance with the data transmitted from the backup memory 102, the CPU 201 restarts the execution of the program (#10).

Operating in the manner as described above, the CPU 201 allows the game player to suspend the execution of a once-started game after instructing the CPU 201 to save data so that, when the power is turned on next time and the CPU 201 is instructed to load data, necessary data is read out from the backup memory 102 and the game is restarted just at the point where it was suspended.

As a result, although the writing or reading of data to and from the backup memory 102 (memory array 9) is impossible unless the data stored in the ID memory 10 within the backup memory 102 is entered, the game player is allowed to save and load data through the usual operations as long as he or she is using an lawfully obtained cassette.

Figure 5:
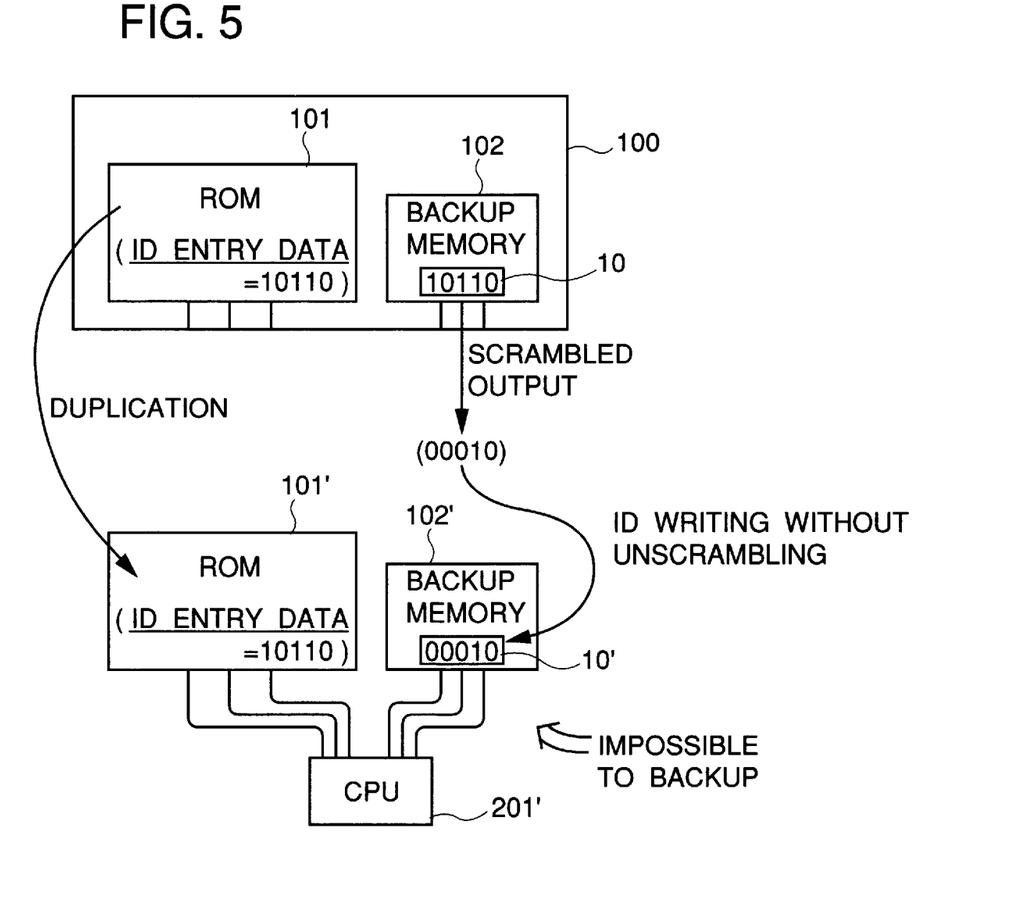
FIG. 5 is a diagram illustrating the advantage of employing the semiconductor memory of the invention as a backup memory.

FIG. 5 illustrates a case where the program stored in the ROM 101 of a, lawfully obtained game cassette 100 has been duplicated illegally by some means. Owing to the design of the program as described above, for the person who made an illegally duplicated ROM 101' to substantially execute the program (or to create a game cassette using such a ROM 101'), he or she needs to obtain the ID data stored in the backup memory 102 within the legally produced cassette 100, prepare a backup memory 102' similar to the backup memory 102 provided in the original cassette 100, and store the obtained ID data in the ID memory 10' within this new backup memory 102'.

However, this requires extremely complicate operations. Specifically, to obtain the ID data stored in the backup memory 102, it is necessary to analyze the duplicated program, or read out the ID data from the backup memory 102. However, considering that the program does not contain the ID read code (the operation code that requests the reading of the data stored in the ID memory 10), the ID data cannot be read out from the backup memory 102 unless the ID read code is obtained first, for example, by disassembling the backup memory 102.

Moreover, even if the ID read code is obtained and it is stored in the backup memory 102, the ID data (for example (10110)) is outputted after being scrambled (00010)) by the scramble circuit 12, and therefore it is necessary to unscramble it (before that, it is necessary even to recognize that it is scrambled). Furthermore, it is necessary to obtain the ID write code (the operation code that requests the writing of data to the ID memory).

Even if the scrambled data (00010) is stored in the ID memory 10' within the backup memory 102', the CPU 201', which operates in accordance with the duplicated program, never transmits to the backup memory 102' the scrambled data (00010) together with the entered ID code (the CPU 201' transmits to the backup memory 102' the unscrambled ID data (10110) together with the entered ID) code). As a result, the entered ID data does not agree with the ID data stored in the backup memory 102', and thus it is impossible to write or read data to or from the backup memory 102'.

In short, by adopting the semiconductor memory of the above-described embodiment as a backup memory, and by appropriately configuring the program stored in the ROM that is incorporated in combination with the backup memory, even if the program stored in the ROM is illegally duplicated, it is impossible to save or load the data that is processed with the progress of the execution of the program, and thus it is impossible to substantially execute the program, unless the person who made the illegal copy bothers to perform complicate operations as described above The above descriptions deal with a game cassette as an example in which, the semiconductor memory of the above embodiment, employed as a backup memory, offers advantages. However, the semiconductor memory of the invention can effectively be used as a backup memory also in various application other than game cassettes.

Moreover, in the semiconductor memory of the above embodiment, only the ID read code is changed in accordance with the ID data. However, it is also possible to change the ID write code in accordance with the ID data in a similar manner as well. Such a semiconductor memory, when adopted as a backup memory, provides a two-fold protection against unauthorized writing of data to the ID memory within the backup memory, and thus helps make it more difficult to substantially execute an illegally duplicated program.

What is claimed is:

1. A semiconductor memory comprising:

first memory means for storing data;

second memory means for storing ID data;

verifying means for checking whether data for comparison is identical with the ID data stored in the second memory means;

means for permitting access to the first memory means when a first operation code is entered only if the verifying means judges that the data for comparison is identical with the ID data stored in the second memory means;

verification control means for making the verifying means check, when a second operation code that is different from the first operation code is entered, whether data entered from exterior circuits combined with the second operation code is identical with the ID data; and operation code changing means for changing the second operation code, which is used to activate the verifying means, in accordance with the data stored in the second memory means.

2. A semiconductor memory as claimed in claim 1, further comprising:

latching means for holding the ID data; and means for reading out the ID data stored in the second memory means to cause the latching means to hold the ID data a predetermined time after electric power starts being supplied, wherein the verifying means compares the data entered for comparison with the ID data held in the latching means.

3. A semiconductor memory as claimed in claim 1, wherein an output of the verifying means is held until a next second operation code is entered.

4. A semiconductor memory as claimed in claim 1, wherein an output of the verifying means is reset when the access to the first memory means is completed.

5. A semiconductor memory as claimed in claim 1, further comprising:

a scramble circuit for scrambling the ID data when the ID data from the second memory means is outputted outside the semiconductor memory.

6. A semiconductor memory comprising:

first memory means for storing data;

second memory means for storing ID data;

verifying means for checking whether data entered as ID data is identical with the ID data stored in the second memory means;

read/write control means for controlling reading and writing operations performed on the first memory means; and a command decoder for producing a driving signal for driving the read/write control means, wherein the command decoder out puts the driving signal when a first operation code is entered only if the verifying means outputs a permission signal, and the command decoder outputs a signal for activating the verifying means when a second operation code is entered.

7. A semiconductor memory as claimed in claim 6, wherein the command decoder comprises:

a plurality of input terminals for receiving an operation code consisting of a plurality of bits;

a plurality of output terminals;

a plurality of latch circuits connected to the output terminals; and switching means connected between the latch circuits and a predetermined-voltage point and controlled by the operation code.

8. A semiconductor memory as claimed in claim 7, wherein switching means that is controlled by an output of the verifying means is provided between the latch circuits that output read signals and the predetermined-voltage point and between the latch circuits that output write signals and the predetermined-voltage point.

9. A semiconductor memory as claimed in claim 7, wherein the plurality of latch circuits include a plurality of latch circuits that output an ID output permission signal for permitting the ID data from the second memory means to be outputted outside the semiconductor memory, and, between these latch circuits and the predetermined-voltage point, switching means that is controlled by a third operation code and switching means that is controlled by the ID data are provided.

10. A semiconductor memory as claimed in claim 9, wherein the ID data from the second memory means is latched in an ID latch circuit in advance, and the ID latch circuit outputs the ID data latched therein when the ID output permission signal is fed from the command decoder.

11. A semiconductor memory as claimed in claim 10, wherein the ID latch circuit is followed by a scramble circuit so that the ID data is outputted after being scrambled.

12. A game cassette having a program memory for storing a program and a backup memory for storing data in accordance with progress of the program being executed, wherein said backup memory comprises:

first memory means for storing data;

second memory means for storing ID data;

verifying means for checking whether data entered for comparison is identical with the ID data stored in the second memory means;

means for permitting access to the first memory means when a first operation code is entered only if the verifying means judges that the data for comparison is identical with the ID data stored in the second memory means;

verification control means for making the verifying means check, when a second operation code that is different from the first operation code is entered, whether data entered for comparison together with the second operation code is identical with the ID data; and operation code changing means for changing the second operation code, which is used to activate the verifying means, in accordance with the data stored in the second memory means.

13. A game cassette as claimed in claim 12, further comprising:

latching means for holding the ID data; and means for reading out the ID data stored in the second memory means to cause the latching means to hold the ID data a predetermined time after electric power starts being supplied, wherein the verifying means compares the data entered for comparison with the ID data held in the latching means.

14. A game cassette as claimed in claim 12, wherein an output of the verifying means is held until a next second operation code is entered.

15. A game cassette as claimed in claim 12, wherein an output of the verifying means is reset when the access to the first memory means is completed.

16. A game cassette as claimed in claim 12, further comprising:

a scramble circuit for scrambling the ID data when the ID data from the second memory means is outputted outside the backup memory.

17. A game cassette having a program memory for storing a program and a backup memory for storing data in accordance with progress of the program being executed, wherein said backup memory comprises:

first memory means for storing data;

second memory means for storing ID data;

verifying means for checking whether data entered as ID data is identical with the ID data stored in the second memory means;

read/write control means for controlling reading and writing operations performed on the first memory means; and a command decoder for producing a driving signal for driving the read/write control means, wherein the command decoder outputs the driving signal when a first operation code is entered only if the verifying means outputs a permission signal, and the command decoder outputs a signal for activating the verifying means when a second operation code is entered.

18. A game cassette as claimed in claim 17, wherein the command decoder comprises:
 a plurality of input terminals for receiving an operation code consisting of a plurality of bits;
 a plurality of output terminals;
 a plurality of latch circuits connected to the output terminals; and
 switching means connected between the latch circuits and a predetermined-voltage point and controlled by the operation code.

19. A game cassette as claimed in claim 18, wherein switching means that is controlled by an output of the verifying means is provided between the latch circuits that output read signals and the predetermined-voltage point and between the latch circuits that output write signals and the predetermined-voltage point.

20. A game cassette as claimed in claim 18, wherein the plurality of latch circuits include a plurality of latch circuits that output an ID output permission signal for permitting the ID data from the second memory means to be outputted outside the buffer memory, and, between these latch circuits and the predetermined-voltage point, switching means that is controlled by a third operation code and switching means that is controlled by the ID data are provided.

21. A game cassette as claimed in claim 20, wherein the ID data from the second memory means is latched in an ID latch circuit in advance, and the ID latch circuit outputs the ID data latched therein when the ID output permission signal is fed from the command decoder.

22. A game cassette as claimed in claim 21, wherein the ID latch circuit is followed by a scramble circuit so that the ID data is outputted after being scrambled.

* * * * *